(No Model.) 2 Sheets—Sheet 1.
J. H. ELWARD.
FRICTION CLUTCH.
No. 301,438. Patented July 1, 1884.
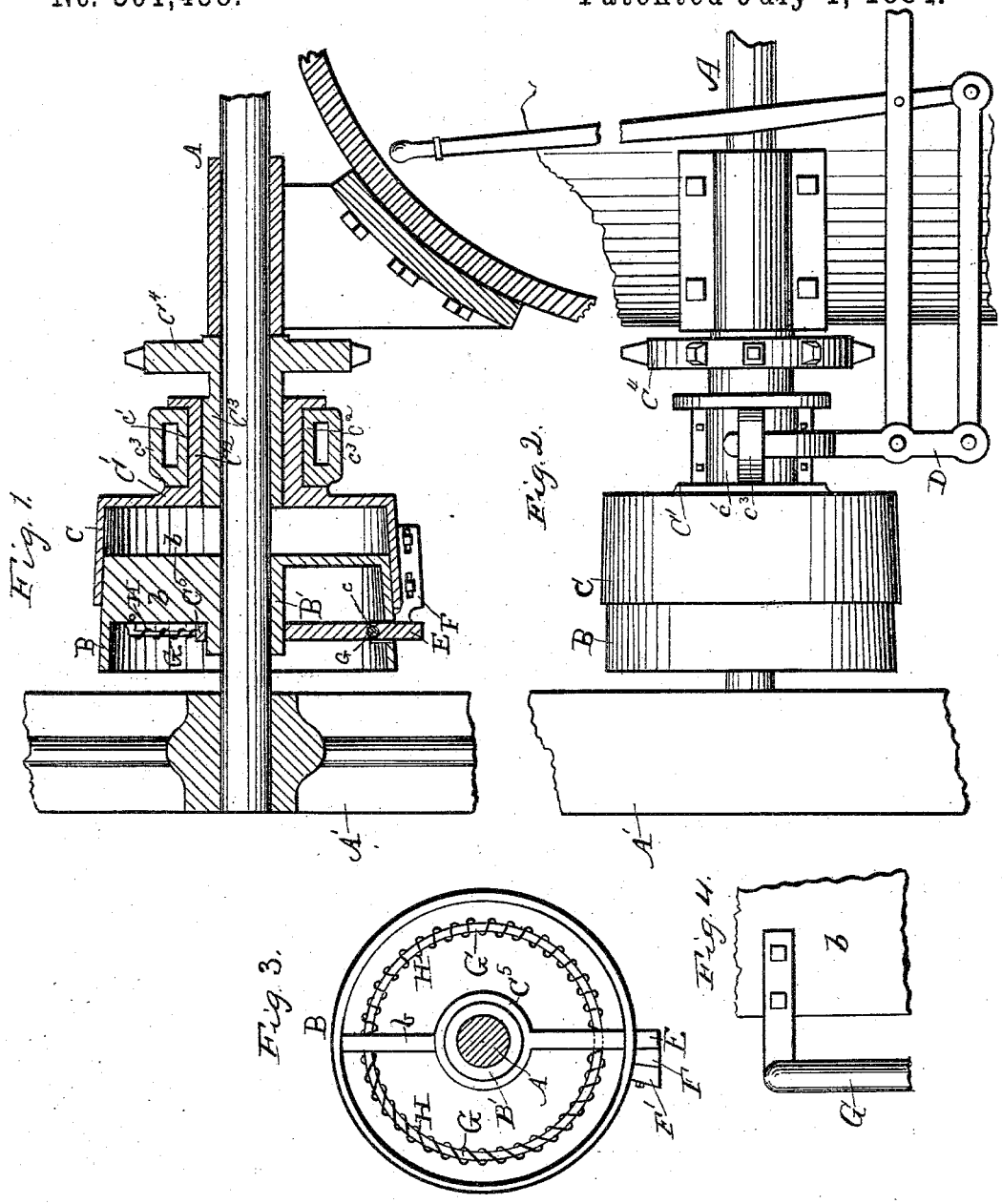

(No Model.) 2 Sheets—Sheet 2.
J. H. ELWARD.
FRICTION CLUTCH.
No. 301,438. Patented July 1, 1884.
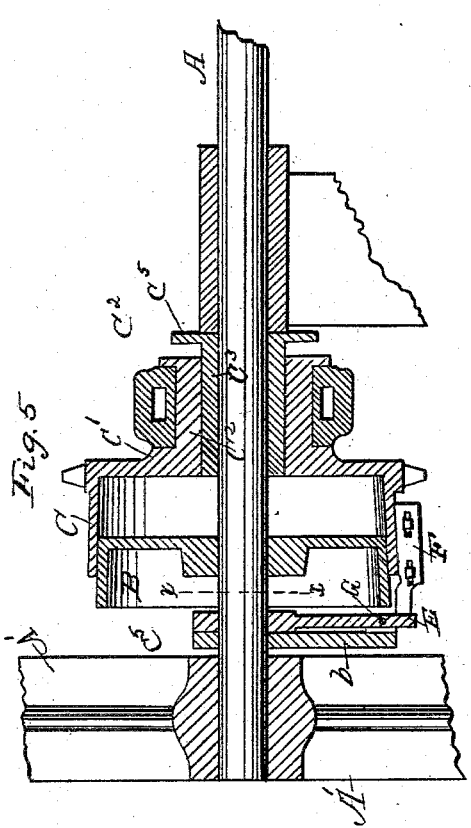
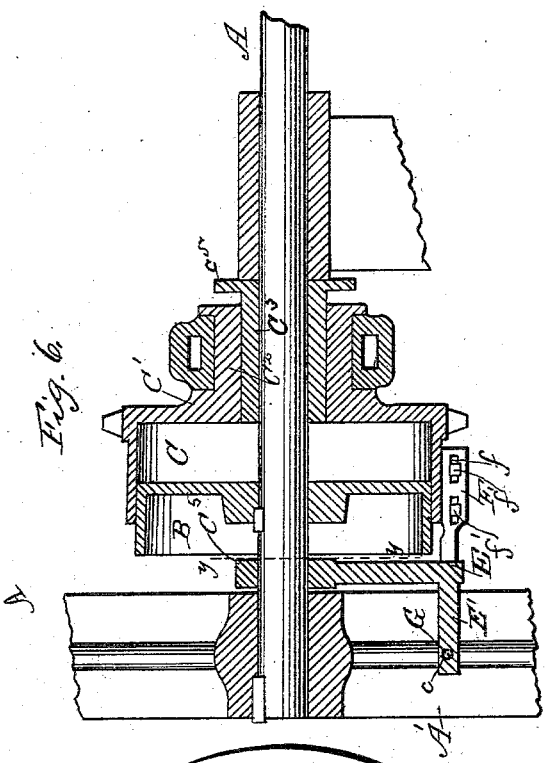
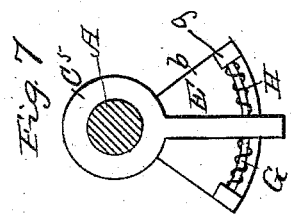
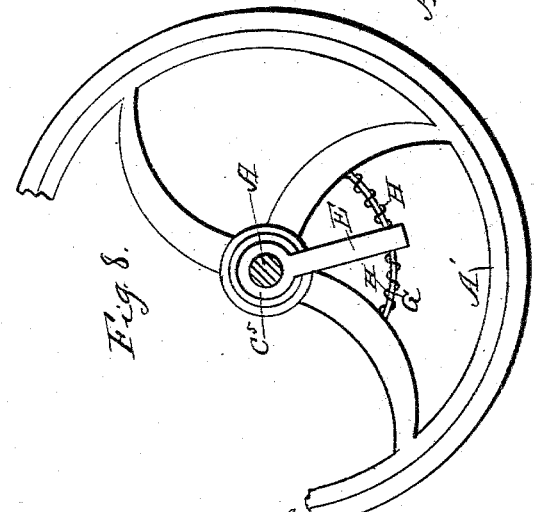
Witnesses:
J. S. Barker
H. Burke
Inventor:
John H. Elward
by Doubleday & Bliss
attys

UNITED STATES PATENT OFFICE.

JOHN H. ELWARD, OF ST. PAUL, ASSIGNOR, BY MESNE ASSIGNMENTS, TO HIMSELF AND D. M. SABIN, OF STILLWATER, MINNESOTA.

FRICTION-CLUTCH.

SPECIFICATION forming part of Letters Patent No. 301,438, dated July 1, 1884.

Application filed December 3, 1883. (No model.)

*To all whom it may concern:*

Be it known that I, JOHN H. ELWARD, a citizen of the United States, residing at St. Paul, in the county of Ramsey and State of Minnesota, have invented certain new and useful Improvements in Friction-Clutches, of which the following is a specification, reference being had therein to the accompanying drawings.

Figure 1 is a longitudinal vertical section of a portion of an engine having my improvements applied thereto. Fig. 2 is a top plan view of the same. Fig. 3 is an elevation from the outside of that portion of the clutch which is fixed to the shaft. Fig. 4 is a detail view. Figs. 5 and 6 illustrate modifications of the invention. Fig. 7 is a sectional view on the line $x\ x$, Fig. 5. Fig. 8 is a sectional view on the line $y\ y$, Fig. 6.

In the drawings, A represents a portion of the shaft of an engine, sufficient to illustrate the mode of attaching my improvements.

In order to make the invention clearly understood, I will describe it more specially as being applied to one of the class known as "traction-engines;" but it will be readily seen that it may be employed with other machinery to advantage, and I do not therefore wish to be limited to its use especially with traction-engines.

The shaft A is adapted both to drive the traction-wheels upon which the engine is supported and also to drive other machinery (while the traction-engine is stationary) by means of a belt passing over the band-wheel A'.

B represents the interior portion of a friction-clutch, it being secured to the shaft A by a key or otherwise, and formed, preferably, with a periphery of the shape of a frustum of a cone, tapering slightly away from that end of the shaft on which is the band-wheel A'. With this interior part of the clutch the exterior portion is adapted to engage, the latter being constructed with a hollow conical part, C, having a hub, C', which either fits on the shaft A, or upon a sleeve fastened to the shaft, or upon a sleeve mounted loosely upon the shaft, or upon a bearing independent of the shaft, which sleeve or bearing will permit it (hub C' and cone C) to slide and revolve. In the construction shown in Fig. 1 the hub C' is formed with a sleeve $C^2$. This sleeve fits upon a sleeve, $C^3$, which, as shown in said figure, is cast with the wheel $C^4$, it being the sprocket-wheel which drives the chain that carries power to the traction-wheels. The sleeve $C^2$ is united with the sleeve $C^3$ by means of a feather, which permits the cone C to slide to and from the cone B without necessitating that the wheel $C^4$ should also move. Other constructions are shown in the drawings differing somewhat in this respect from that in Figs. 1 and 2, and which will be hereinafter described.

The cone C and its hub C' and sleeve $C^2$ are moved to and fro upon the shaft A, or upon the bearing, of whatever sort, which supports them, by means of a shipping-lever, D, which is connected with the aforesaid parts by means of a strap or loop, $c'\ c^2$, having ears $c^3$, into which are fitted the ends of the lever. This lever may be of any of the ordinary constructions, and may be operated by any suitable devices. I have shown a form of device substantially similar to that illustrated in an early patent of mine; but it will be understood that the special character of this does not enter into the essential parts of the present invention.

Heretofore it has been customary in engines having friction-clutches to have the shipping-lever so arranged that it, together with its strap, loop, or collar, could be caused to press against the sliding portion of the clutch to hold it in engagement with the other part. As a result it has been found that much wear and loss are incident to this construction, from the fact that sand and other foreign materials find access to the wearing-surfaces and operate to rapidly cut said surfaces, so as to impair and render them worthless. To obviate this difficulty I combine with the friction-clutch the following devices, whereby, after an engagement has been obtained between the friction-surfaces, there is effected a positive engagement between properly-situated projections, and after this positive engagement has been produced between said parts the pressure is no longer necessary to hold the frictional parts in engagement, and therefore the wear between the collar and the hub of the sliding part of the friction can be overcome.

E represents a projecting arm or tooth, which is attached to and carried by the part of the clutch which is secured to the shaft, and F represents a corresponding tooth, projection, arm, or other similar device carried by the sliding part of the clutch, these two teeth, arms, or projections being arranged so that at the proper time they can be caused to engage positively, and while they are in engagement the part C of the clutch will be rotated by the part B positively.

B' represents the sleeve or collar which carries the part B, and this is formed with a web or flange, $b$. To this web or flange there is secured a guide or support, G, which is preferably arranged to extend around the sleeve B', and is concentric therewith. The stop, arm, or tooth E can be mounted upon the sleeve or collar B' by means of a collar, $C^5$, it having also an eye or aperture, $c$, by means of which it is fitted upon the guide G. When thus arranged it will be seen that the part E can swing forward and back, and yet be held firmly concentrically with the shaft and sleeve B'.

H H represent spiral springs supported upon the guide G, and arranged to abut against a stop thereon or against the web or flange $b$. By examining Fig. 3 it will be seen that one of these is, relatively speaking, upon one side of part E and the other upon the other side thereof, and that, therefore, when the said part E swings in one direction it compresses one of the springs H, and vice versa.

The arm, projection, or tooth F is preferably secured adjustably to the part C of the clutch, and this can be effected by having a bar or flange, F', Fig. 3, cast upon said part C, and providing part F with slots $f$, adapted to permit said part F to slide to a limited extent, there being bolts $f'$, by means of which it can be clamped rigidly in position. The ends of the parts E and F are so related in position that after the frictional surfaces have been forced into engagement they (the ends of the parts E and F) shall lie in the same plane transversely of the shaft, and therefore engage or be ready to engage with each other. After being so placed, if there should be a slight disengagement of the frictional surfaces, one part of the clutch will revolve sufficiently to bring the part E into engagement with the part F, after which the two parts of the clutch will revolve together by a positive engagement.

As indicated above, with engines constructed as heretofore, it has been impracticable to relieve the friction-clutch of the pressure exerted through the shipping-lever and its collar or strap, for if thus relieved the engine will be disconnected from the parts to be driven and the latter will stop; but by the devices herein described, when the projections are brought into contact, the surfaces affected by the shipping-lever are relieved entirely from frictional pressure and serious difficulties in engines of the older styles are overcome.

By employing springs of substantially the character described, breakage is prevented, and the positive engagement between the parts E and F can be effected without any danger of shock; but I do not wish the remaining features of the invention to be limited to the employment of these springs.

In Figs. 5 and 7 there is shown a slightly modified construction of devices, and the parts in this case relating to the invention can be readily applied to the friction-clutches of engines as they are now made and in use. In this case the collar $C^5$ is mounted directly on the shaft A, and carries a tooth or projection, E, substantially similar to that shown in Fig. 1. The part $b$ in this case is in the form of a segmental plate keyed to the shaft A. In this case, as in that in Fig. 1, it supports the guide G and the springs H, the guide being shown as being fastened in ears or lugs $g$, carried by plate or web $b$. The operation of the devices here is substantially analogous to that in the construction in Fig. 1, as will be readily understood. In this construction, in Figs. 5 and 7, the sprocket-teeth are carried by the outer portion, C, of the friction-clutch, the latter being mounted by means of its sleeve $C^2$ upon the loose sleeve $C^3$, having a flange, $c^5$, which receives any backward thrust resulting from the motion of the cone C. This sleeve $C^3$ may, if preferred, be keyed or fastened to the shaft.

In Figs. 6 and 8 there is shown another form of the device, in this case use being made of the fly-wheel or of a wheel having spokes as part of the apparatus. The guide G is mounted in two of the spokes of the wheel, and the projection, arm, or tooth E carries an outwardly-extending short arm, E', provided with an aperture, $c$, by which it is fitted to the guide G and held thereby properly in place.

As said above, while I have preferred to herein illustrate the invention as being specially applicable to traction-engines, yet it may be used with others in which employment is made of friction-clutches. So, too, it will be readily seen that many of the parts can be more or less varied in structure and position without departing, essentially, from the spirit of the invention.

What I claim is—

1. The combination of the shaft, the friction-clutch, one part of which is carried by the shaft and the other part of which is driven thereby by frictional engagement, a tooth or projection rotated by the shaft independently of the second aforesaid part of the clutch, and a second tooth or projection, arranged substantially as set forth, to be brought into engagement with the first aforesaid tooth or projection after the frictional faces have been brought into engagement.

2. The combination of the shaft, the friction-clutch, having one part carried by the shaft and the other part adapted to be driven by the first aforesaid part by frictional engagement, and teeth or projections, arranged substantially as set forth, to be brought into engagement after the parts of the clutch have been brought into frictional engagement, substantially as set forth.

3. The combination of the shaft, the clutch, having one part carried by the shaft and the other part adapted to be driven by the first aforesaid part by frictional engagement, the tooth or projection carried by the second aforesaid part of the frictional clutch, the tooth or projection carried by the first aforesaid part of said clutch, and the spiral spring, arranged substantially as set forth, to receive the first impact or pressure experienced by the last aforesaid tooth or projection, as described.

4. The combination of the shaft, the friction-clutch, having one part secured to the shaft and another part driven by the first aforesaid part by frictional engagement, the tooth or projection carried by the second aforesaid part of the friction-clutch, a tooth or projection carried by the shaft and adapted to positively engage with the first aforesaid tooth or projection, and springs arranged, respectively, at the sides of the last aforesaid tooth or arm, whereby the latter can yield, substantially as set forth.

In testimony whereof I affix my signature in presence of two witnesses.

JOHN H. ELWARD.

Witnesses:
F. B. KENNER,
R. C. MOORE.